Jan. 29, 1957

G. R. HUARD, JR 2,779,901

TRANSISTOR UNIT

Filed May 15, 1953

INVENTOR.

G. Raymond Huard, Jr.

BY

Norman L. Mueller

Atty.

United States Patent Office 2,779,901

Patented Jan. 29, 1957

2,779,901

TRANSISTOR UNIT

George R. Huard, Jr., Phoenix, Ariz., assignor to Motorola, Inc., Chicago, Ill., a corporation of Illinois Application May 15, 1953, Serial No. 355,310

9 Claims. (Cl. 317—235)

The present invention relates to semi-conductor transistor units, and more particularly to an improved transistor unit of the point contact type and to an improved and simplified manufacturing method for fabricating such a transistor.

The point contact type of transistor usually comprises a crystal of semi-conductive material such as germanium or silicon that has been treated to exhibit, for example, "N" or negative characteristics when a positive-negative-positive or "P-N-P" type point contact transistor is desired. The present invention will be described in conjunction with such a P-N-P type point contact transistor, but it is to be understood that the invention is equally applicable to point contact transistors of the negative-positive-negative or "N-P-N" type in which the crystal is treated to exhibit "P" or positive characteristics.

The point contact transistor usually includes a pair of electrodes known respectively as the emitter and collector, and which has pointed extremities contacting a surface of the crystal. A third electrode, usually in the form of a metal block or tab, is also provided and affixed to another surface of the crystal to constitute a base electrode for the transistor.

When the transistor unit is assembled, it is usual practice to electro-form the crystal by impressing negative voltage pulses between the collector electrode and base, and sometimes also between the emitter electrode and base. This application of negative voltage pulses provides P type areas within the crystal around the point of contact between the crystal and the collector and emitter electrodes. The unit now exihibits desired transistor characteristics, that is, the resulting unit includes an N type crystal with a small dish-shaped P area around the point of contact of the collector electrode, and also in some instances around the point of contact of the emitter electrode.

The emitter and collector electrodes of the prior art transistor units, as previously noted, usually take the form of a pair of fine wires or thin metallic ribbons extending perpendicular to a surface of the crystal with pointed ends contacting that surface at spaced points. The transistor is an extremely small device and the fine wire emitter and collector electrodes are of microscopic dimensions and spacing. For example, the diameter of the electrodes is about .005" and they are spaced .002" on a face of a crystal having cubical dimensions of about .032" on a side. This renders the manufacture of this tyep of transistor relatively complicated when prior art practices are followed, since such practices require critical manual spacing and assembling operations of the fine wire electrodes. In addition, due to the difficulties in mounting such electrodes, it is difficult if not impossible to achieve any degree of uniformity between individual ones of a plurality of transistor units constructed in accordance with prior art practices. Moreover, the use of such fine wires for the collector and emitter electrodes in point contact transistor units usually results in the device having a relatively low mechanical stability and a high degree of mechanical sensitiveness due to the inherent nature of its construction.

Another disadvantage in using fine wires for the emitter and collector electrodes of point contact transistors is the limitation in the power capabilities of the transistor because the power output of the unit is in part dependent on the heat dissipating capacity of these electrodes which is extremely low. Therefore, the power output capacity of the transistor using this type of electrodes is limited as is the amount of current that can be safely passed through the device without damaging the electrodes. This latter factor also renders the electro-forming process extremely difficult due to the limitation on the amount of electro-forming current that can be passed through the device, and this sometimes results in insufficient forming in the transistor crystal.

It is accordingly an object of the present invention to provide an improved point contact transistor unit that may be manufactured easily and with a minimum of mechanical skill, and which is so constructed that uniform characteristics may be obtained between individual units of a quantity manufactured in accordance with the invention.

Anoher object of the invention is to provide such an improved point contact transistor unit that is rugged in its construction and which possesses a high degree of mechanical stability.

Yet another object of the invention is to provide such an improved point contact transistor unit that is constructed to have relatively high power handling capabilities as compared with the prior art devices of this type and which is more susceptible to adequate electro-forming.

A still further object of the invention is to provide a new and improved manufacturing method for the fabrication of components for point contact transistor units.

A feature of the invention is the provision of a point contact transistor unit in which the collector and emitter electrodes have the form of metallic sheets supported on one surface of an insulating panel with a corner of each sheet making respective contact with a semi-conductive crystal so that the sheets constitute emitter and collector electrodes for the crystal, and in which the metallic sheets are separated a selected amount and insulated one from the other by bending slightly the insulating panel to give the surface on which the sheets are supported a convex shape.

Another feature of the invention is the provision of an improved manufacturing process in which the emitter and collector assembly for a transistor unit is constructed by placing a pair of metallic sheets on one surface of an insulating panel in abutting and contacting relation, securing the sheets to the panel, and then bending the panel slightly to separate the sheets a desired amount.

The above and other features of the invention which are believed to be new are set forth with particularity in the appended claims. The invention itself, however, together with further objects and advantages thereof, may best be understood by reference to the following description when taken in conjunction with the accompanying drawing in which:

Figures 1, 2:
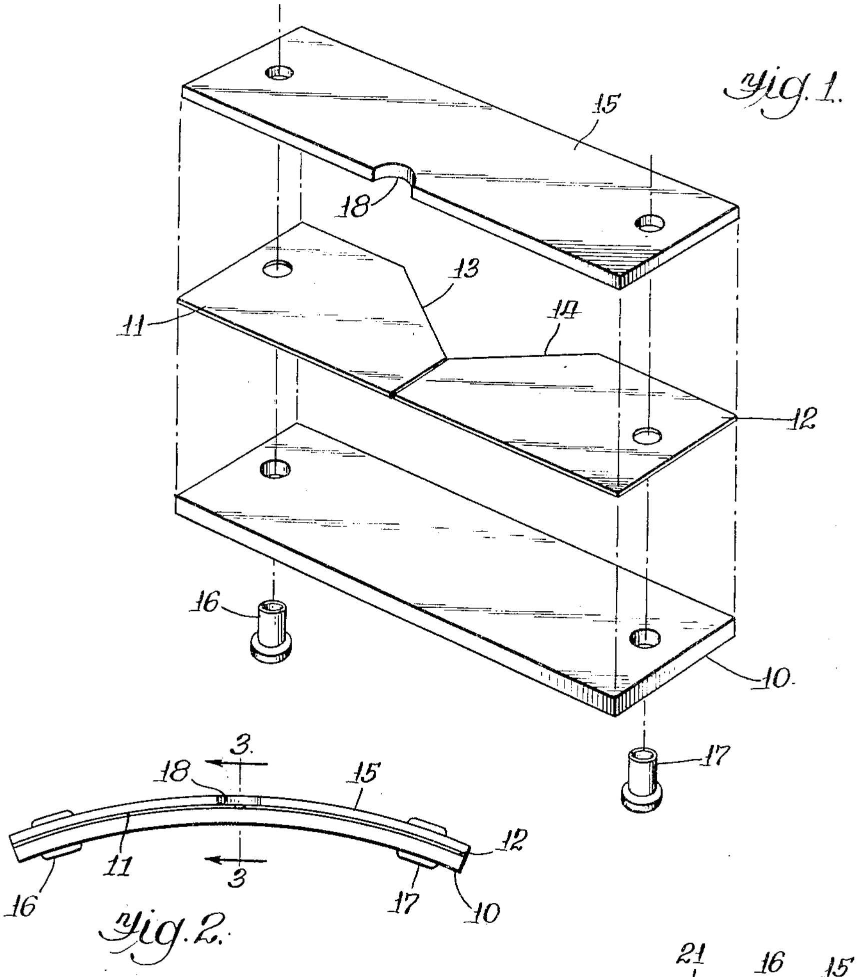
Figure 1 is an exploded view of a collector and emitter electrode assembly constructed in accordance with the invention.
Figure 2 is a bottom view of the assembly.

The present invention provides a circuit element which comprises an insulating panel having a curved configuration to provide convex and concave surfaces. A pair of electrically conductive metallic sheets is disposed on the convex surface of the panel adjacent one another and having a pair of parallel contiguous edges spaced from each other by a selected amount so that the metallic sheets are spaced and insulated one from the other.

The collector and emitter assembly of the present invention is illustrated in the accompanying drawing and, in accordance with the invention, a flat insulating plate 10 is provided with a pair of metallic sheets 11 and 12 laid over one surface thereof with their contiguous edges in abutting relation. The contiguous edges of sheets 11 and 12 preferably have parallel portions and inwardly inclined portions 13 and 14, the latter forming a notch when the sheets are in abutting relation. The purpose of this configuration is to reduce the capacity and likelihood of short-circuiting between the sheets 11 and 12 to a minimum in the final assembly. A further flat insulating panel 15 is then laid over the sheets 11 and 12 so that the sheets are sandwiched between insulating panels 10 and 15. The unit is held together by a pair of eyelets 16 and 17 which extend through apertures in the insulating plates 10 and 15 and in the metallic sheets 11 and 12, the eyelets making respective electrical contact with the metallic sheets to constitute terminals therefor.

It is to be noted that in the preliminary step in the manufacturing process, the sheets 11 and 12 are sandwiched between insulating plates 10 and 15 with the parallel portion of their contiguous edges in abutting contact with the plates and short-circuited one to the other. When the assembly is secured by eyelets 16 and 17, it is bent a selected amount to have the configuration shown in Figure 2. This bending causes the sheets 11 and 12 to be supported on a convex surface of plate 10 and against a concave surface of plate 15 and to be separated from each other by a selected amount. It is to be noted that this technique provides for the microscopic separation desired between sheets 11 and 12 by the simple expedient of bending the assembly by a relatively large amount which greatly simplifies the process of providing the desired separation between the sheets. The top plate 15 maintains a positive pressure on the sheets 11 and 12 and holds them firmly on the convex surface of bottom plate 10. Sheets 11 and 12 may originally be a single sheet which is sheared prior to bending to form the two sheets.

The bending of the electrode assembly may be accomplished by heat or force and suitable material, such as a thermoplastic resin, is used for the insulating panels 10 and 15 so that the finished assembly has a permanent set such as shown in Figure 2.

Figure 3:
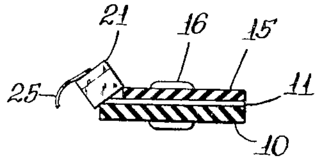
Figure 3 is a sectional view of the assembly with a crystal in point contact relation therewith.

Insulating plate 15 has a notch 18 formed in one side thereof adjacent the extremities of the parallel portions of the contiguous edges of sheets 11 and 12. Due to the bending of the assembly, these corners are separated by a selected amount so that an edge of a semi-conductive crystal may be placed at an angle (such as shown in Figure 3) against these corners, with the corners making a point contact with the crystal on either side of that edge. The pressure of these corners against the crystal can be easily controlled by the strength of the spring 25 supporting the crystal 21.

The following dimensions for the various elements of the electrode assembly are given merely by way of example to emphasize the extremely small dimensions of the crystal unit, and are not intended to limit the invention in any way.

| | Mils |
|---|---|
| Thickness of panel **15** | 10–15 |
| Thickness of sheets **11** and **12** | 1–3 |
| Thickness of insulating panel **10** | 20–30 |
| Length of unit | 400–500 |
| Width of unit | 250–300 |
| Width of sheets **11** and **12** at the notch formed by inclined edges **13** and **14** | 50–100 |
| Amount of separation between sheets **11** and **12** | ½ to 3 |

The sheets 11 and 12 may be formed of beryllium copper of No. 4 hardness, or of Phosphor bronze or of any other suitable material. It is noted that panel 10 is approximately twice as thick as panel 15 and constitutes the principal support for the assembly.

Figure 4:
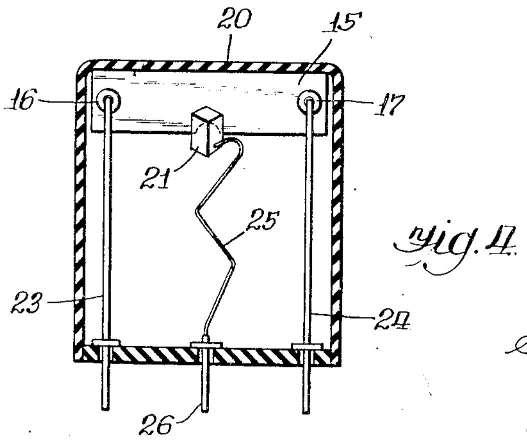
Figure 4 is a view partly in section of a transistor unit constructed to incorporate the teachings of the invention.

Figure 4 shows the electrode component of Figures 1–3 mounted in a suitable casing 20 and having the semi-conductive crystal 21 held in notch 18 against the corners of electrodes 11 and 12 in the manner previously described herein.

The component is supported within the casing by a pair of rigid metal leads 23 and 24 which respectively contact eyelets 16 and 17 and extend through the bottom of the casing. In this manner, leads 23 and 24 support the component within the casing and also form electrical connections for the emitter and collector electrodes. Crystal 21 is held at a tilt against notch 18 by a resilient metallic strip 25 having one end soldered to a face of crystal 21 to constitute the base electrode, and having its other end connected to a metallic lead 26 extending through the bottom of casing 20. Element 25 therefore functions as a resilient support for the crystal, and it also functions as a base electrode and connector thereto. It is apparent that when so desired, element 25 may be in the form of a solid lead and elements 23 and 24 may be resilient strips holding the electrode assembly down over the tilted edge of the crystal.

The electrode assembly of the present invention may be constructed in a relatively simple and expeditious manner as there is no requirement for the precise locating and assemblage of microscopic elements, as is the case when fine wire is used to constitute the emitter and collector electrodes. The amount of bending of the electrode assembly can be precisely controlled so that the separation between the electrodes can be standardized enabling uniform characteristics to be obtained between individual units manufactured in accordance with the invention. In addition, the sheet electrodes of the present invention have an appeciable surface area with relatively high heat dissipating capabilities so that the transistor has relatively high power capabilities, and also the transistor is subject to adequate electroforming since appreciable current can be passed by the electrodes 11 and 12 without damaging them. The resulting assembly also has a high degree of mechanical stability and ruggedness as compared with the prior art fine wire transistors.

While a particular embodiment of the invention has been shown and described, modifications may be made and it is intended in the appended claims to cover all such modifications as fall within the true spirit and scope of the invention.

I claim:

1. A circuit element including in combination, a supporting member having a convex surface, and a pair of electrically conductive sheets disposed on the convex surface of said member adjacent one another and having a pair of contiguous edges spaced from each other by an amount so related to the curvature of said surface that said edges abut one another when said surface is flat, whereby said sheets are spaced one from the other.

2. A circuit element including in combination, an insulating panel having a curved configuration to provide convex and concave surfaces, and a pair of electrically conductive metallic sheets disposed on the convex surface of said panel adjacent one another and having a pair of parallel contiguous edges spaced from each other by an amount so related to the curvature of said panel that said edges abut one another when said panel is flat, whereby said sheets are spaced and insulated one from the other.

3. A circuit element including in combination, an insulating panel having a curved configuration to provide convex and concave surfaces, and a pair of electrically conductive metallic sheets disposed on the convex surface of said panel adjacent one another, said sheets having a pair of contiguous edges, and said contiguous edges having respective inwardly inclined portions and having further respective portions in spaced parallel relation, the spacing of said parallel portions of said contiguous edges being so related to the curvature of said panel that said portions abut one another when said panel is flat, whereby said sheets are spaced and insulated one from the other and the capacitive coupling therebetween is reduced to a minimum.

4. A circuit element including in combination a first insulating panel having a curved configuration to provide convex and concave surfaces, a second insulating panel having a curved configuration to provide convex and concave surfaces, and a pair of electrically conductive metallic sheets sandwiched between said convex surface of said first panel and said concave surface of said second panel, said sheets being disposed adjacent one another and having a pair of parallel contiguous edges spaced from each other by an amount so related to the curvatures of said first and second panels that said edges abut one another when said panels are flat, whereby said sheets are spaced and insulated one from the other.

5. A circuit element including in combination, a first insulating panel having a curved configuration to provide convex and concave surfaces, a second insulating panel having a curved configuration to provide convex and concave surfaces, a pair of electrically conductive metallic sheets sandwiched between said convex surface of said first panel and said concave surface of said second panel, said sheets being disposed adjacent one another and having a pair of contiguous edges, said contiguous edges having respective inwardly inclined portions and having further respective portions in spaced parallel relation and defining a pair of sharp corners at one of their extremities, whereby said sheets are spaced and insulated one from the other and the capacitive coupling therebetween reduced to a minimum, and said second panel having a notch formed therein adjacent said sharp corners to expose said corners and enable electrical contact to be made thereto.

6. A circuit element including in combination, a first insulating panel having a curved configuration to provide convex and concave surfaces, a second insulating panel having a curved configuration to provide convex and concave surfaces, a pair of electrically conductive metallic sheets sandwiched between said convex surface of said first panel and said concave surface of said second panel, said sheets being disposed adjacent one another and having a pair of contiguous edges, said contiguous edges having respective inwardly inclined portions and having further respective portions in spaced parallel relation and defining a pair of sharp corners at one of their extremities, whereby said sheets are spaced and insulated one from the other and the capacitive coupling therebetween reduced to a minimum, said second panel having a notch formed therein adjacent said sharp corners to expose said corners and enable electrical contact to be made thereto, and a pair of electrically conductive elements extending through the aforesaid components in respective electrical contact with said metallic sheets to maintain said components in an assembled condition and to constitute respective terminals for said metallic sheets.

7. A method for forming a circuit element which comprises, providing a flat panel, securing a pair of electrically conductive members to one surface of said panel one adjacent the other with the contiguous edges of said members in abutting relation, and bending said panel so that said surface thereof has a convex configuration to separate said contiguous edges of said members by a preselected amount.

8. A method for forming a circuit element which comprises providing a flat panel, placing a pair of electrically conductive sheets on one surface of said panel one adjacent the other with the contiguous edges of said sheets in abutting relation, securing said sheets to said panel, and bending said panel so that said surface thereof has a convex configuration to separate said contiguous edges of said sheets by a selected amount.

9. A method for forming a circuit element which comprises, providing a first flat panel, placing a pair of electrically conductive sheets on one surface of said panel one adjacent the other with the contiguous edges of said sheets in abutting relation, placing a second flat panel over said first panel with said sheets sandwiched between said panels, securing said panels and sheets together, and bending the resulting assembly so that said metallic sheets engage a convex surface of said first panel and a concave surface of said second panel to separate said contiguous edges of said sheets by a selected amount.

References Cited in the file of this patent

UNITED STATES PATENTS

| | | |
|---|---|---|
| 1,493,713 | Tykociner | May 13, 1924 |
| 2,219,003 | Braunschweig et al. | Oct. 22, 1940 |
| 2,584,461 | James et al. | Feb. 5, 1952 |
| 2,618,691 | Bethge et al. | Nov. 18, 1952 |